(12) United States Patent
Anderson

(10) Patent No.: US 10,661,400 B1
(45) Date of Patent: May 26, 2020

(54) ADJUSTABLE STORY STICK

(71) Applicant: Robert Anderson, Phoenix, AZ (US)

(72) Inventor: Robert Anderson, Phoenix, AZ (US)

( * ) Notice: Subject to any disclaimer, the term of this patent is extended or adjusted under 35 U.S.C. 154(b) by 408 days.

(21) Appl. No.: 15/647,513

(22) Filed: Jul. 12, 2017

(51) Int. Cl.
| B23Q 3/00 | (2006.01) |
| B23Q 1/28 | (2006.01) |
| B23Q 3/06 | (2006.01) |
| B23Q 1/52 | (2006.01) |

(52) U.S. Cl.
CPC ............... B23Q 3/007 (2013.01); B23Q 1/28 (2013.01); B23Q 1/525 (2013.01); B23Q 3/06 (2013.01); *B23B 2260/0045* (2013.01)

(58) Field of Classification Search
CPC .......... B23Q 3/007; B23Q 1/28; B23Q 1/525; B23Q 3/06; B23B 2260/0045
See application file for complete search history.

(56) References Cited

U.S. PATENT DOCUMENTS

| 495,761 | A | * | 4/1893 | Shepard | E05D 11/0009 |
| | | | | | 33/197 |
| 2,244,303 | A | * | 6/1941 | Mackey | E04F 21/003 |
| | | | | | 33/197 |
| 2,365,436 | A | * | 12/1944 | Saucier | B23Q 1/525 |
| | | | | | 269/69 |
| 2,655,732 | A | * | 10/1953 | Morgan | E04F 21/003 |
| | | | | | 33/197 |
| 3,206,861 | A | | 9/1965 | Damijonaitis et al. | |
| 4,873,769 | A | * | 10/1989 | Casanave | B25H 7/00 |
| | | | | | 33/194 |
| 5,029,394 | A | * | 7/1991 | Carey | B27F 5/12 |
| | | | | | 33/194 |
| 5,067,537 | A | * | 11/1991 | Offner | B25B 5/003 |
| | | | | | 144/144.1 |
| 5,367,783 | A | * | 11/1994 | Nygren | E04G 21/1891 |
| | | | | | 33/478 |
| 5,892,848 | A | | 1/1999 | Beall | |
| 2007/0283528 | A1 | * | 12/2007 | McDaniel | E05D 11/0009 |
| | | | | | 16/221 |

FOREIGN PATENT DOCUMENTS

| GB | 2463965 | 4/2010 |
| GB | 2490139 | 10/2012 |

OTHER PUBLICATIONS

You Tube—Oct. 2011—Woodpeckers Story Stick Pro (Year: 2011).*
Woodpeckers Story Stick Pro Catalog Pages (displays images and details consistent with You Tube video published Oct. 2011) (Year: 2011).*
Doug Stowe, Easy Hinge Installation with a Flipping Story Stick, Basic Box Making, Taunton Press, 2006.

* cited by examiner

*Primary Examiner* — Marc Carlson
(74) *Attorney, Agent, or Firm* — Venjuris, P.C.

(57) ABSTRACT

A tool or hinge positioning jig for creating hinge mortises including a hinge jaw having an hinge jaw first portion opposite and substantially parallel to an hinge jaw second portion, and an exterior first surface facing opposite an exterior second surface wherein at least one of the exterior first surface or the exterior second surface is laterally adjustably coupled to the hinge jaw, and wherein the hinge jaw first portion and hinge jaw second portion are capable of being aligned with first and second hinge edges, respectively, and the exterior first surface and exterior second surface are capable of being aligned with first and second workpiece edges, respectively.

16 Claims, 3 Drawing Sheets

ADJUSTABLE STORY STICK

FIELD OF THE INVENTION

The present invention relates to the field of woodworking and tools or aids to assist woodworking.

SUMMARY OF THE INVENTION

The present disclosure includes disclosure of a new wood working tool. The tool or hinge positioning jig simplifies the relative placement and creation of mortises for hinges and facilitates accuracy in doing so. The tool or jig may be scaled to alternate sizes and shapes to accommodate alternate hinge sizes or workpiece geometries. The tool may be characterized as an adjustable story stick for mortising a hinge setting on box edges and box lids and may generally include a hinge jaw having an hinge jaw first portion opposite and substantially parallel to an hinge jaw second portion, and an exterior first surface facing opposite an exterior second surface wherein at least one of the exterior first surface or the exterior second surface is laterally adjustably coupled to the hinge jaw, and wherein the hinge jaw first portion and hinge jaw second portion are capable of being aligned with first and second hinge edges, respectively, and the exterior first surface and exterior second surface are capable of being aligned with first and second workpiece edges, respectively. The tool may further be described as a hinge positioning jig, comprised of a substantially rectangular center mass having a hinge jaw within which hinges are securable, and a left edge spacer and a right edge spacer, with each spacer laterally adjustably coupled to the center mass. Again, the hinge jaw is capable of being sized to the dimensions of a hinge being applied to a workpiece, and the left edge spacer and right edge spacer are capable of being laterally extended or retracted to align with each workpiece edge, respectively.

Numerous other advantages and features of the present invention will become readily apparent from the following description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views.

DESCRIPTION OF PREFERRED EMBODIMENTS

Figure 1A:
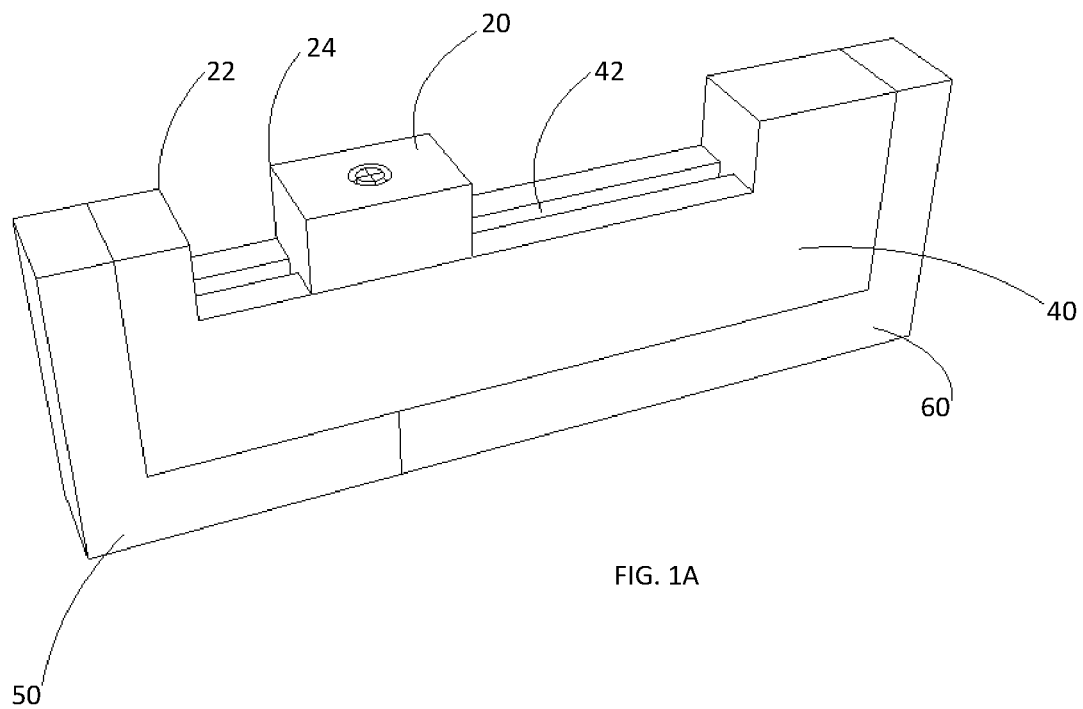
FIGS. 1A-1B illustrate an embodiment of the tool or jig with a first elbow 50 and second elbow 60 contracted and expanded, respectively.

The invention described is adaptable to embodiments having many different forms and functions related to the disclosure herein. The embodiment shown in the drawings and will be described herein in detail with the understanding that the present disclosure is to be considered as an exemplification of the principles of the invention and is not intended to limit the invention to the specific embodiment(s) illustrated. Systems consistent with the present invention may be alternately embodied, practiced, and/or carried out in various ways or implementations. Also, it is to be understood that the phraseology and terminology employed herein, as well as the abstract included below, are for the purposes of description and should not be regarded as limiting. Reference throughout this specification to "embodiment" should inform a person having ordinary skill that a particular feature, structure, or characteristic described in connection with the embodiment is included in at least one embodiment of the present invention but not necessarily in all embodiments. The features, structures, or characteristics of any embodiment of the present invention may be combined in any suitable manner and in any suitable combination with one or more other embodiments, including the use of selected features without corresponding use of other features. Modifications may be made to adapt an implementation of certain features to the essential scope and spirit of the present invention and certain features, limitations, or elements of each embodiment can be omitted or replaced with equivalents. It should be understood that other variations and modifications of the embodiments of the present invention described and illustrated herein are possible and part of the spirit and scope of the present invention. Finally, the disjunctive term "or" herein, is generally intended to mean "and/or", having both conjunctive and disjunctive meanings (i.e. not an "exclusive or" meaning), unless so indicated. And, as used in the description herein and throughout the claims that follow, "a", "an", and "the" should be interpreted as "at least one" and include plural references unless the context dictates otherwise.

As one example of an implementation or embodiment, aspects of this disclosure are adapted to construct an adjustable tool, jig, or story stick for placement of hinges on a workpiece such as for woodworking or carpentry and placement of a hinge upon a box edge and/or a box lid. The tool generally comprises a plurality of several tool portions that are laterally adjustably securable relative to each other to set the relative positioning and extent of horizontal travel of a routing bit based on the size of a hinge and the desired positioning of the hinge on a box lid and/or box edge. The tool portions may be constructed from many alternate materials including wood, plastic, and metal and the tool portions may be scaled depending on the size of the workpiece or box, box lid, and the desired possible positioning and size of the hinge to be placed.

Figure 1B:
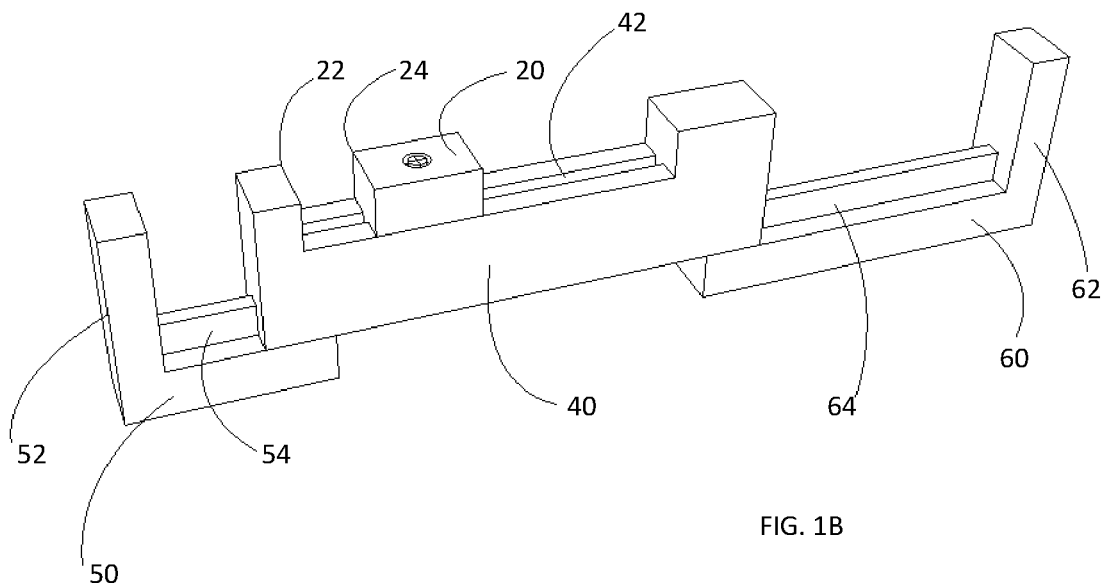
Figure 2:
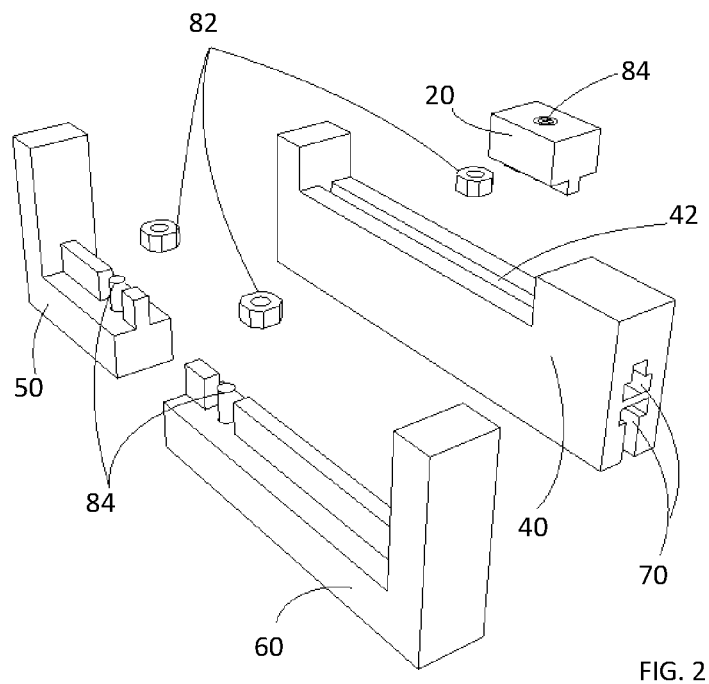
FIG. 2 illustrates and exploded view of the tool including fastening hardware and tooling within the center mass 40 to secure the first elbow 50 and second elbow 60 to a center mass 40, and to secure a hinge jaw 20 to the center mass 40.
Figure 3:
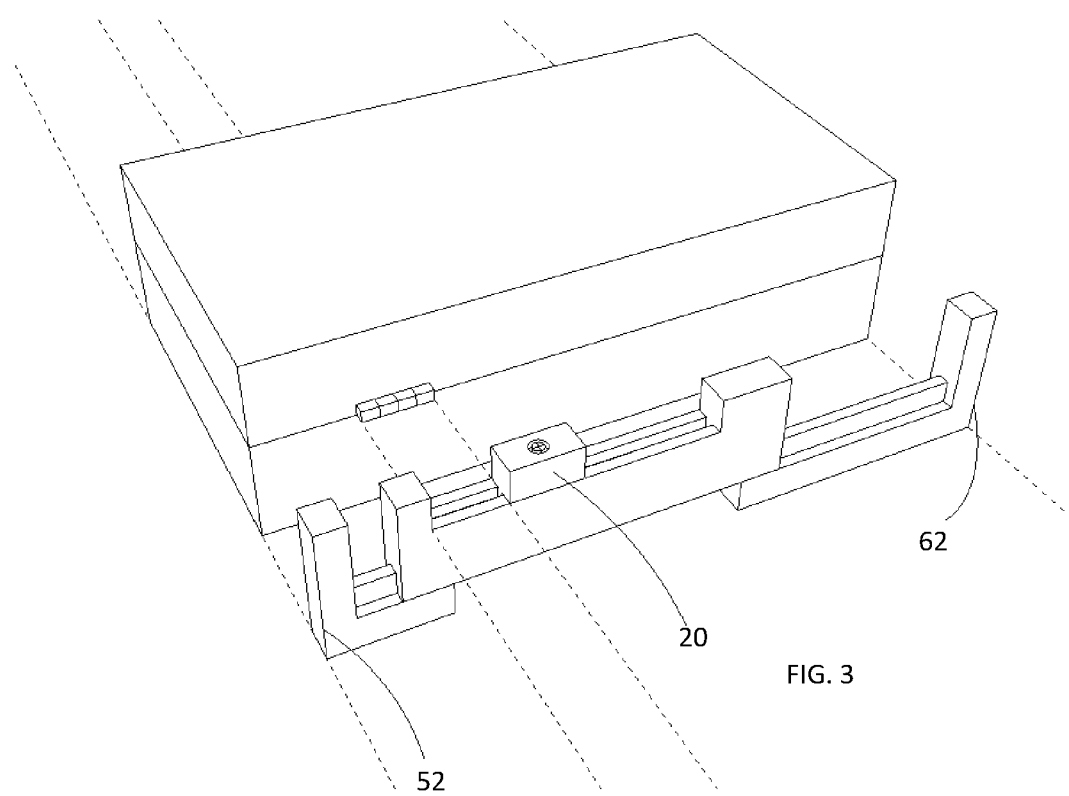
FIG. 3 illustrates the tool with the hinge jaw 20 sized for the hinge to be set on a workpiece or cigar box, and the first elbow vertical segment 52 and second elbow vertical segment 62 extended to align with the outside edges of the box.

A preferred embodiment of the invention is illustrated in FIGS. 1-3 and may comprise a center mass 40 or center body from and to which the remaining tool portions are adjustably secured. A preferred center mass 40 comprises a substantially rectangular block and further includes a hinge jaw 20 that is adapted to receive the hinge to be set or placed on the workpiece. The hinge jaw 20 is adapted to receive the width of the hinge by clamping on the hinge edges as illustrated in FIG. 3. A right edge spacer and a left edge spacer are laterally adjustably coupled to the center mass 40 and are adjusted to set or determine where, relative to the workpiece lateral edges, the routing bit will be allowed to travel. The tool may be used to place a hinge on the left side of a box or box lid by securing a hinge in the hinge jaw 20, laterally adjusting the left edge spacer so that the exterior or outer surface of the left edge spacer aligns with the box edge, which corresponds to the spacing between the hinge and the left edge of the workpiece. The right edge spacer is then adjusted to align with the right edge of the workpiece, which corresponds to the spacing between the hinge and the right edge of the workpiece. A hinge may be placed on the right side of a box or box lid by flipping the tool 180 degrees laterally relative to the width of the workpiece.

Further, whereas the hinge jaw 20 may comprise a separate portion or mass secured to the center mass 40, a preferred hinge jaw 20 is machined, cut, or tooled into the center mass 40 such that it includes first and second negative edges in the center mass 40 top edge and forming a channel 42 between a hinge jaw first portion 22 positioned opposite and substantially parallel to a hinge jaw second portion 24. The hinge jaw first portion 22 and hinge jaw second portion 24 are capable of being aligned with first and second hinge edges, respectively, which corresponds to the width of the hinge positioned between the hinge jaw first and second portions, 22 and 24, respectively, and determines the boundary within which a routing bit will be allowed to travel laterally on a workpiece edge or lid. In preferred embodiments, at least one of the hinge jaw first portion 22 or hinge jaw second portion 24 is laterally adjustably securable relative to the other to accommodate use of the tool with alternate hinge widths. Further, whereas either or both of the hinge jaw portions, 22 and 24, may be laterally adjustably securable relative to the other, only one laterally adjustably securable hinge jaw portion is necessary as is illustrated.

The drawings illustrate a practical and preferred hinge jaw 20 constructed, tooled, or cut into a center mass 40. The center mass 40 may be substantially rectangular as illustrated or may be other shapes depending on the shape of the workpiece, workpiece lid, or hinge. Further, the hinge jaw first portion 22 is a surface fixed relative to, or an actual surface of, the center mass 40 and the hinge jaw second portion 24, is a laterally adjustable securable to the center mass 40. For example, the center mass 40 may include a hinge jaw channel 42 and the hinge jaw second portion 24 is laterally adjustably securable within the hinge jaw channel 42. A preferred hinge jaw channel 42 comprises a lower substantially horizontal surface notched into the top edge of the center mass 40 formed by cutting a rectangular shaped notch in center mass 40 top edge. Thereafter, the hinge jaw first portion 22 may comprise the left or first negative edge/surface of the notching and the hinge jaw second portion 24 may be secured in the channel 42 as illustrated in FIG. 2. Specifically, first and second a T-shaped nut biasing passages 70 are fashioned within the center mass 40, each having a first passage portion wide enough to slidingly receive a fastening nut 82 but narrow enough to prevent the fastening nut 82 from rotating, and coupled to a second passage portion wide enough to allow a fastening bolt 84 to engage the fastening nut 82 and rotate. Each respective fastening bolt 84 may be rotated to snug each of the hinge jaw 20, and first elbow 50 and second elbow 60 to the center mass 40.

The tool further includes a right edge spacer and a left edge spacer that are laterally adjustably coupled to the center mass 40 and used to determine the maximum horizontal or lateral boundary of the routing bit for mortising a hinge setting. Preferred embodiments of the right edge spacer and left edge spacer comprise a first elbow 50 with a first elbow vertical segment 52 and a first elbow lateral segment 54, and a second elbow 60 having a second elbow vertical segment 62 and a second elbow lateral segment 64, respectively. The first elbow vertical segment 52 and second elbow vertical segment 62 each include an outside surface that are respectively aligned with the left and right workpiece or box edges and that set the stops of a routing table to determine the maximum horizontal or lateral boundary of the routing bit for mortising a hinge setting. The first and second elbow segments, 50 and 60, further comprise a first elbow lateral segment 54 and a second elbow lateral segment 64, each of which are is laterally adjustably coupled to the center mass 40. Further, either one or both of the spacer vertical or horizontal segments may be lengthened to accommodate alternate workpiece sizes or hinge placements.

Figure 4:
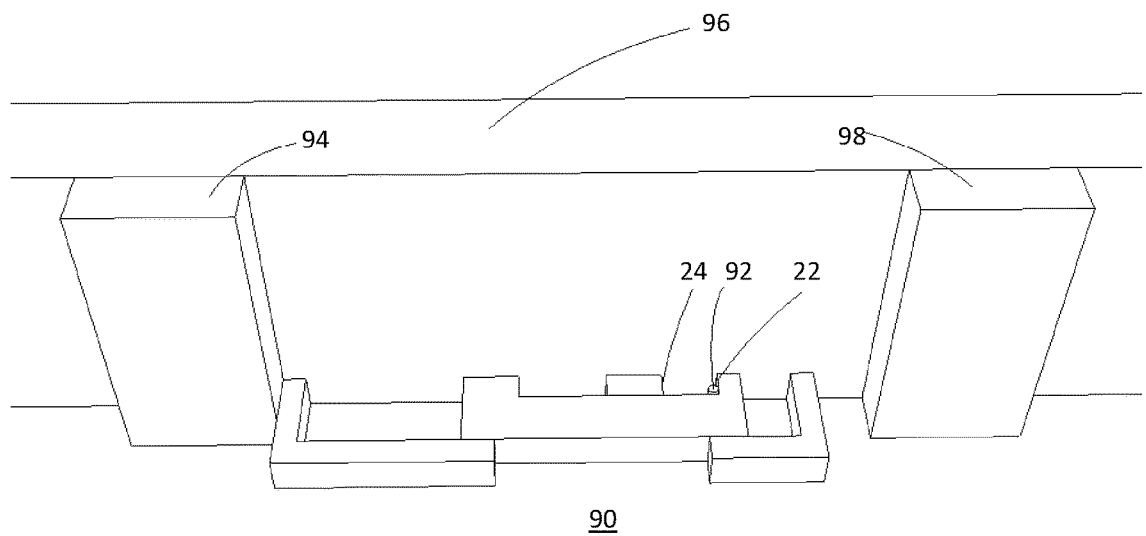
FIG. 4 illustrates the tool on a router table 90 where the cutting edge of the bit 92 is just aligned or touching the outside edge side of the hinge jaw second portion 24 and the left fence stop 94 adjusted to touch the jig.
Figure 5:
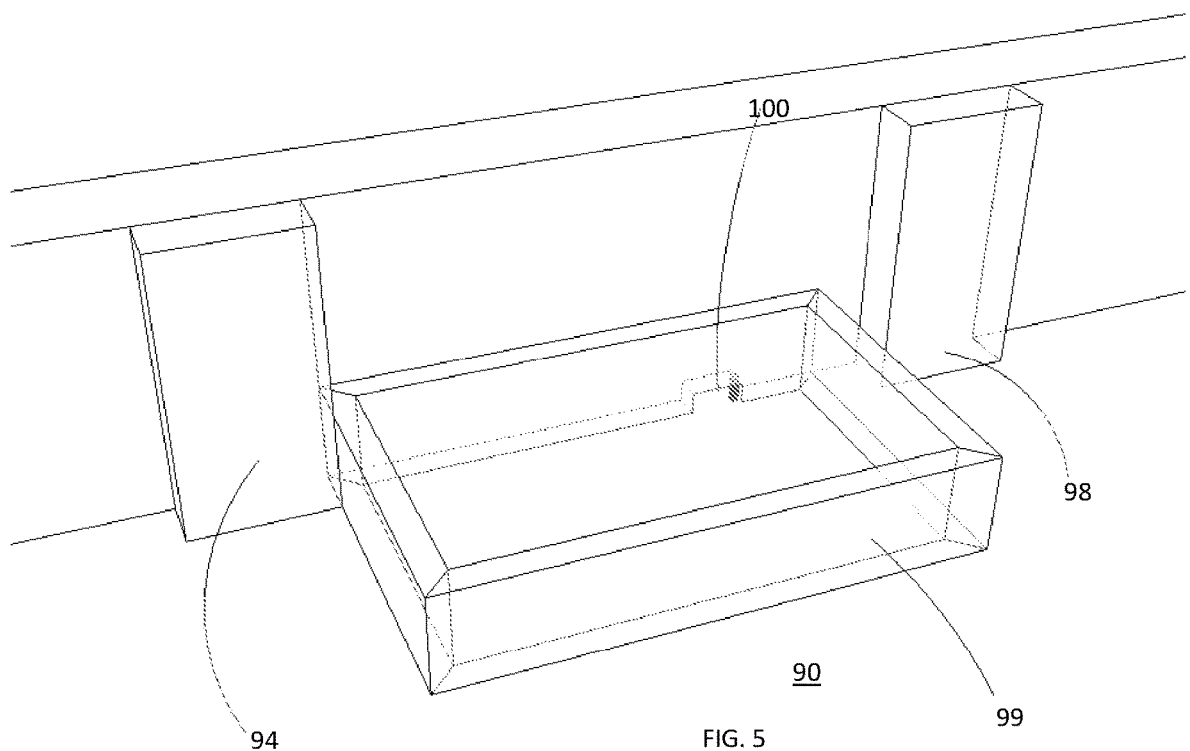
FIG. 5 illustrates a top lid 99 being routed with the router table stops 94, 98 in place.

The tool or jig described is used to set up a router table 90 for making mortises. First, the hinge jaw 20 is adjusted to fit the required hinge by placing the hinge between hinge jaw first portion 22 and the hinge jaw second portion 24. The left edge spacer is adjusted for the spacing from the left edge of the box to the hinge. See FIG. 3. The right edge spacer is next adjusted to the size of the box. After performing these setup steps, the tool or jig it represents a 1:1 relationship with the box that will get mortised for the selected hinge. See FIG. 4. The router table 90 may now be set to create the mortise. The router bit 92 is rotated so that the cutting edge faces left to right in relationship with the router table fence 96. The jig is then placed where the cutting edge of the bit 92 is just aligned or touching the outside edge side of the hinge jaw second portion 24 and the left fence stop 94 adjusted to touch the jig. The left edge of the hinge jaw first portion 22 is then adjusted to just touch the router bit 92 and the router table fence right stop 98 is aligned with the right edge spacer. This jig spacing determines the exact size and placement of the mortis. See FIG. 5. With the router table stops in place, one mortis 100 in the lid 99 and one in the box are routed. Next, the jig is flipped 180 degrees, the router table stops 94, 98 re-adjusted as described above, and the other side of the box and lid are mortised so that the hinge jaw 20 is now 180 degrees in relationship with the router table.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents and all such modifications that fall within the scope of the claims.

The invention claimed is:

1. A device for setting up a router to mortise a hinge on a box and corresponding lid, the device comprising:
   a first elbow slidably connected to a central block, the first elbow comprising a first outside face, the central block comprising a first inside face parallel to the first outside face,
   a second elbow slidably connected to the central block, the second elbow comprising a second outside face parallel to the first outside face, the first elbow and the second elbow are slidingly adjustable relative to the central block to create a first distance between the first and second outside faces establishing an outer width, wherein the outer width can be adjusted to match a width of the box, and
   a hinge jaw slidably connected to the central block, the hinge jaw comprising a second inside face parallel to the first inside face, the hinge jaw is slidingly adjustable relative to the central block to create a second distance between the first and second inside faces establishing an inner width, wherein the inner width can be adjusted to match a width of a hinge.

2. The device of claim 1, wherein the second elbow is slidingly adjustable relative to the central block to create a third distance between the first inside face and second outside face establishing a hinge distance, wherein the hinge distance can be adjusted to match the distance between an outside face of the box and a hinge location.

3. The device of claim 1, the device comprising a planar top surface.

4. The device of claim 3, the device comprising a planar bottom surface.

5. The device of claim 1, further comprising a first distal surface located on the first elbow, a second distal surface on the second elbow, and a third distal surface on the central block, wherein the first distal surface, the second distal surface and the third distal surface are co-planar.

6. The device of claim 5 further comprising a fourth distal surface located on the hinge jaw, wherein the first distal surface and the fourth distal surface are co-planar.

7. The device of claim 1 comprising at least one fastener, the at least one fastener configured to provide temporary fixing of at least the outer width or the inner width.

8. The device of claim 7, the at least one fastener comprising at least one fastening nut configured to secure inside a T-shaped slot.

9. A device for adjusting a table router for mortising for a hinge, the device comprising:
   a first slidable connection between a first elbow and a central block and
   a second slidable connection between a second elbow and the central block, wherein the distance between a first outside face of the first elbow and a second outside face of the second elbow can be adjusted to match a width of a box, and
   a third slidable connection between a hinge jaw and the central block, wherein a distance between a first inside face of the central block and a second inside face of the hinge jaw can be adjusted to match a width of a hinge.

10. The device of claim 9 wherein the second elbow is slidingly adjustable relative to the central block to change the distance between the first inside face and the second outside face to match a desired distance between an outside face of a box and an edge of the hinge.

11. The device of claim 9, the device comprising a planar top surface.

12. The device of claim 11, the device comprising a planar bottom surface.

13. The device of claim 1 comprising at least one fastener, the at least one fastener configured to provide temporary fixing of at least the outer width or the inner width.

14. The device of claim 13, the at least one fastener comprising at least one fastening nut configured to secure inside a T-shaped slot.

15. The device of claim 9 further comprising a first distal surface located on the first elbow, a second distal surface on the second elbow, and a third distal surface on the central block, wherein the first distal surface, the second distal surface and the third distal surface are co-planar.

16. The device of claim 15 further comprising a fourth distal surface located on the hinge jaw wherein the first distal surface and the fourth distal surface are co-planar.

* * * * *